INVENTOR.
DAVID L. EISENSTADT
BY Bosworth, Sessions,
Henstrom & Cain
ATTORNEYS

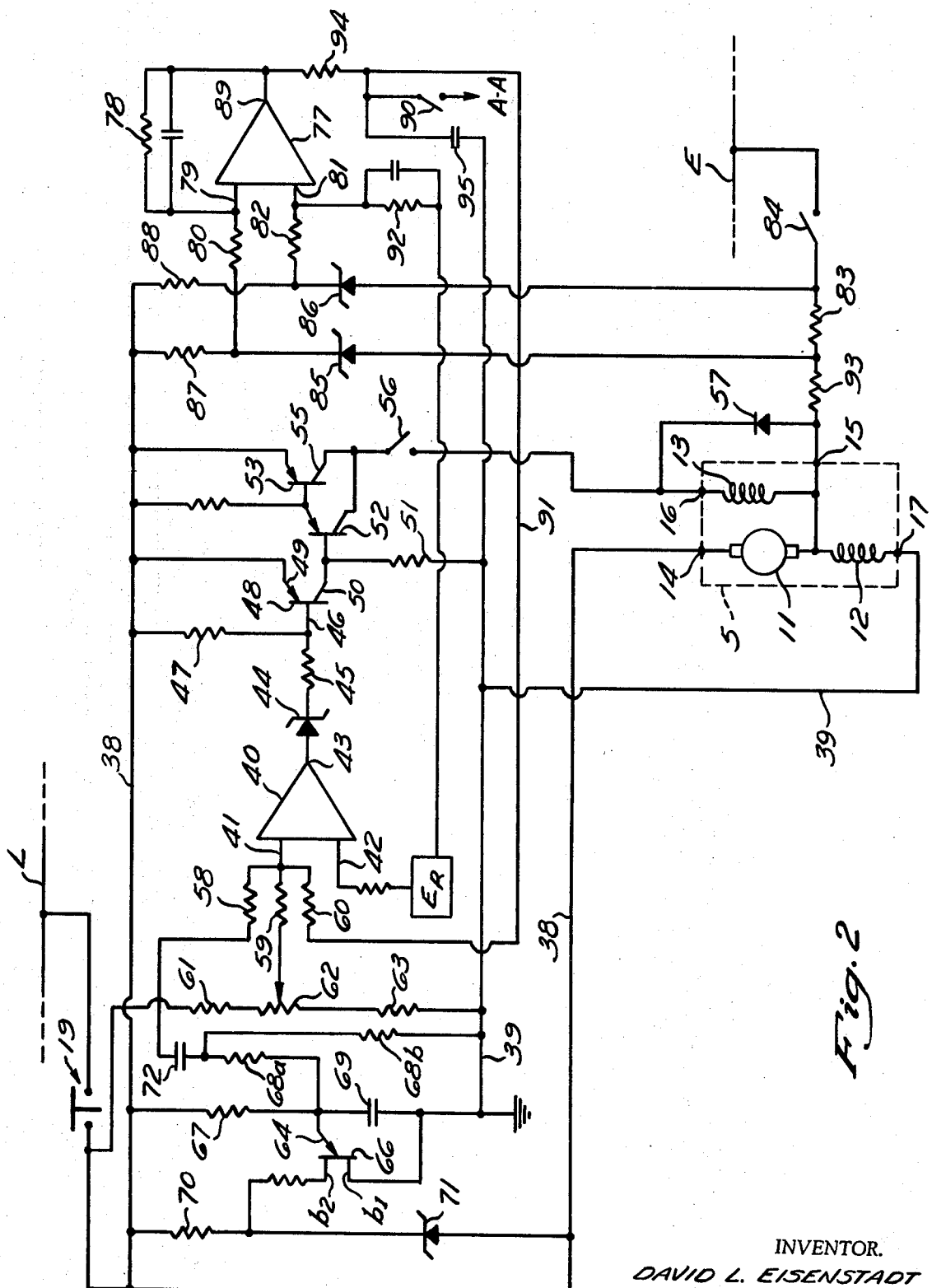

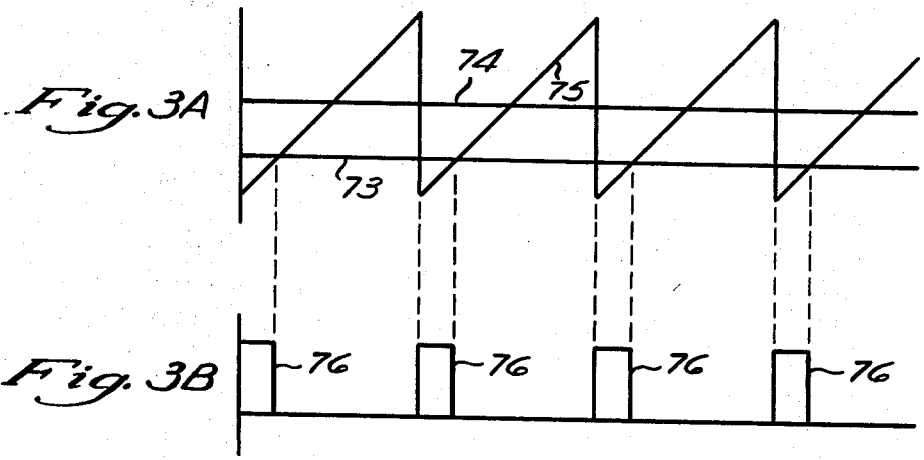
Fig. 3A
Fig. 3B
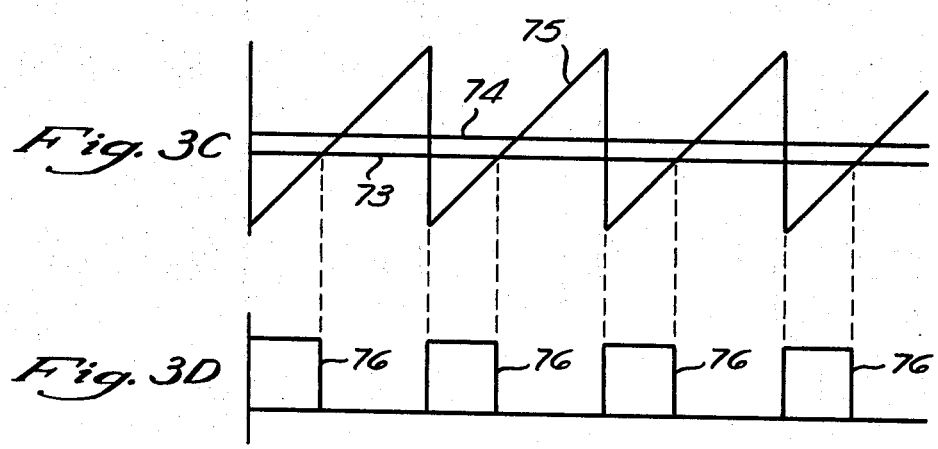
Fig. 3C
Fig. 3D
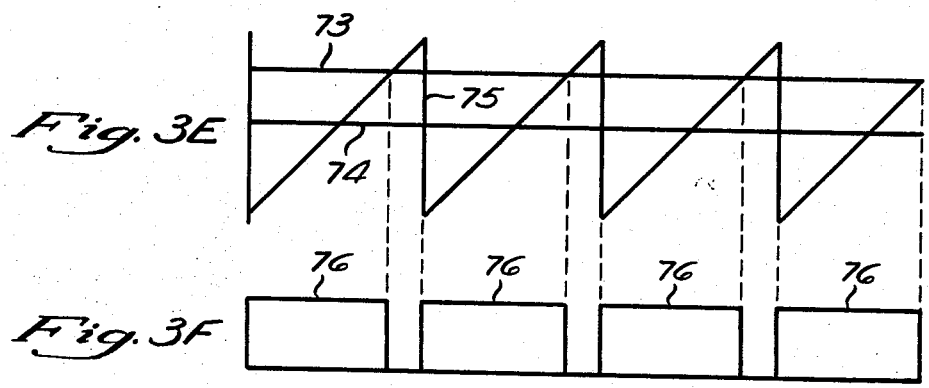
Fig. 3E
Fig. 3F

INVENTOR.
DAVID L. EISENSTADT
BY Bosworth, Sessions,
Hairston & Chin
ATTORNEYS 3,546,532
D.C. PROTECTION AND CONTROL PANEL
David L. Eisenstadt, Bedford, Ohio, assignor to Lear Siegler, Inc., Santa Monica, Calif., a corporation of Delaware
Filed Dec. 4, 1967, Ser. No. 687,667
Int. Cl. H02h 3/00, 7/00
U.S. Cl. 317—13
5 Claims

ABSTRACT OF THE DISCLOSURE

A system for controlling the operation of and protecting a D.C. generator alone and in a parallel system of D.C. generators. The system performs the general control functions of voltage regulation, generator paralleling, load equalization, and the general protection functions of fault detection, overvoltage protection, and including the taking of appropriate action such as disconnecting or preventing the disconnection of the controlled generator from a parallel system.

BACKGROUND OF THE INVENTION

This invention relates to control and protection of direct current generators including D.C. generators of the type which may be operated in parallel in an aircraft electrical system. Operation of such generators and generator systems includes control of local generator output voltage, equalization of the load among the several generators on the line and protection against current flow from line to generator. Such a control and protection system accomplishes these and other functions by controlling generator field excitation, connection of the local generators to the main load bus, and connection of the local generators to the equalizing bus.

In the past, control circuits for direct current generators have employed control and sensing elements which are rather large and heavy for airborne use. Voltage regulation of a D.C. generator, for example, is accomplished conventionally by a carbon pile regulator connected to regulate the generator field excitation. Such a device normally consists of a pile of carbon discs, the total resistance of which varies inversely with the degree of compression applied. A proportioning type electromagnetic actuator responds to the output voltage of the generator and controls the amount of compression, thereby varying proportionately the resistance of the carbon pile. As a result, more or less current flows to the exciter field of the generator and increases or decreases the generator output voltage. This type of regulator is heavy and relatively slow acting. Furthermore, it is inefficient because it is required to dissipate considerable wattage in its resistance.

Similarly, conventional controls for providing load equalization, overvoltage protection, differential protection and main contactor control are normally accomplished by large, expensive, slow-acting, specially-constructed relays.

For example, connection of the local generator of a parallel generator system to the main load bus is generally accomplished by a main line contactor. Before a local generator can be put on the line, however, there should be no undesirable voltage difference between the main load bus and the local generator. Once the local generator is connected to the main load bus, it is necessary to sense and indicate the flow of any reverse current to the local generator indicating its having become a load on the parallel system instead of a contributor to it. In the past, separate circuits or a special complex relay has been required to sense voltage difference between the main bus and the local generator and to sense reverse current flowing to the local generator after connection to the mian bus. Such a relay, however, is expensive, heavy, and extremely delicate.

Also, the means for disconnecting the local generator from the parallel system in case of overvoltage or a ground fault of some type is conventionally a specially-built relay adapted to sense the overvoltage or the difference in current in different parts of the system caused by the ground fault. Such a relay normally is also heavy, expensive, and delicate. In all the specially-built relays mentioned above and used for disconnecting the local generator from all or part of the system, a built-in weighting factor is required to determine that the sensed conditions actually exist and continue for a predetermined length of time and that a mere transient signal has not been sensed. These relays are required, in effect, to integrate a sensed condition over a small period of time to determine that it actually exists. This requirement adds to the size and expense of such special relays.

To a limited extent, the disadvantages of size and weight associated with the electromechanical control devices referred to above have been reduced through the use of elemental solid state devices such as power transistors, silicon controlled rectifiers, and Zener diodes. Such savings are achieved, however, at a sacrifice in mechanical simplicity exchanged for elaborate circuits designed to utilize the solid state devices as control and sensing elements. Furthermore, when such solid state devices are used and operated in their active region as proportional controllers, they are required to dissipate wattage as heat. Excessive heat can cause thermal runaway and require large heat-absorbing surfaces or cooling devices for acceptable operation. Solid state devices thus offer only a partial solution to some of the problems of the electromechanical devices.

Solid state devices such as those mentioned above sometimes can be operated as switches rather than proportioning devices which reduces the amount of power they are required to dissipate and thereby increases their efficiency. One type of regulator that uses this principle depends upon the generator's ability to follow load conditions and swtiches the field on and off as required to maintain desired terminal voltage. Under such conditions, for example, a D.C. generator is controlled by having its field fully excited or unexcited as required by the load and the generator's ability to recover and hold terminal voltage. A disadvantage of this type of regulator is low frequency of correction causing high line ripple. This ripple tends to produce a high level of radio noise and poor quality power.

This type of control has been found to be particularly unsatisfactory in controlling a parallel system of D.C. generators supplying current to a common load. Normally, the on or off state of the field excitation means is determined by the output level of the generator and the amount of load it is carrying. In such a case, the local generator calls for changes in excitation at a rate dependent upon the generator's inherent speed of response to the excitation. An operational frequency of the on-off excitation means is thus established that is related to the natural resonant response frequency of the generator. This phenomenon causes a problem when two or more generators so controlled are paralleled to the same load because normal differences in their respective speeds of response to excitation cause a load unbalance between the generators and set up oscillation of load between them.

SUMMARY OF THE INVENTION

A preferred embodiment of this invention comprises cooperating and interrelated circuit means to control the operation of a local D.C. generator acting alone and in a system of paralleled generators in accordance with predetermined operating conditions and in an appropriate and predetermined manner under fault conditions which may exist or occur in the system.

The circuit means includes a field excitation control circuit of the on-off type in which a solid state switch is controlled to feed current pulses at a relatively high frequency and of varying widths to the field winding of the local generator in a pulse width modulation arrangement. The pulsing switch is controlled by an integrated circuit linear operational amplifier operated as a bistable device. The bistable device is provided with a differential input and is responsive to sensed and algebraically combined indications of generator output voltage, a relatively high frequency pulsing signal, and a load equalization signal and the relationship of this combined signal to a reference level. The load equalization signal is provided by another integrated circuit linear operational amplifier operated as a modified differential amplifier and responsive to the sensed voltage difference resulting from any unequal sharing of the load by the local generator and other paralleled generators of the system. A unijunction oscillator provides the pulsing signal at a 1000 cycle per second rate, for example. The pulsing signal is a periodic sawtooth signal which serves to pulse the excitation switch once each cycle with a pulse of current whose duration depends upon the generator output voltage signal and the load equalization signal. The excitation current pulses are supplied to the field winding of the local generator at a rate of 1000 cycles per second. Although the excitation is of the on-off type, the rate of excitation is so much faster than the normal response time of conventional on-off type regulators that the generator responds as though it were receiving constant proportional excitation and enjoying all the benefits associated therewith. Thus, the field excitation control circuit of this invention combines the advantages of a proportional controller and of an on-off type controller to solve the problems and remedy the disadvantages inherent in conventional applications of each of those control methods.

The automatic line contactor control circuit comprises the combination of a first differential input integrated circuit linear operational amplifier operated as a bistable device for providing on-off control of the main contactor connecting the generator to the load bus and a second differential input integrated circuit linear operational amplifier connected as an integrator to perform the dual functions of sensing the voltage between main load bus and local generator before the main conductor is closed and sensing reverse current flow into the local generator after the main contactor is closed. When the main contactor is open, the differential input of the first operational amplifier senses the voltage difference between the main load bus and the local generator. When the voltage of the local generator equals or exceeds voltage of the main bus, the second and integrating operational amplifier begins to integrate; and, if the condition is maintained, the integrated output causes the energization of the main contactor coil and thereby connects the local generator to the load bus. When the main contactor is closed, the first differential input operational amplifier senses any voltage difference between its terminals caused by reverse current flow to the local generator. When such a condition is detected, the second and integrating operational amplifier begins to integrate the signal; and, if the condition maintains itself long enough, the integrated signal will cause the main contactor to be de-energized, disconnecting the local generator from the main load bus and from the equalizer bus. The automatic line contactor control circuit of this invention combines a differential input integrator and on-off type control elements to control the main contactor in an advantageous, efficient, and reliable manner and without special relays. In addition, the circuit performs both the function of differential voltage sensing and the function of reverse current sensing.

The field relay trip control circuit disclosed senses fault conditions in the system of which the local generator is an element, and controls connection of the generator to the system in accordance with a predetermined desired course of action. A preferred embodiment of the field relay trip control circuit includes solid state switches for disconnecting the generator from the line, means for detecting local ground faults, a first differential input integrating operational amplifier for sensing start ground faults, and a second differential input integrating operational amplifier responsive to sensed conditions of overvoltage, overexcitation and a voltage regulator failure, and a start ground fault for disconnecting the local generator from the parallel system when an undesirable condition continues for a predetermined length of time. Local ground faults developing after the local generator is connected to the main load bus are detected by a current transformer sensing load current at a point as near as possible to the local generator and another sensing load current at a point as near as possible to the main load bus. Any difference in load current detected by the two current transformers actuates means to disconnect the local generator from the system and the load fault condition from the system.

In addition to the individual functions of each circuit described above, the separately described circuits interact and cooperate to complement and supplement the principal functions of each circuit. Means are included, for example, to implement predetermined fail-safe alternatives in the event the control circuitry or some portion of it ceases to function in the normal manner.

Throughout the embodiment of this invention described below, operational amplifiers, and particularly differential input integrating amplifiers, are used as sensing and control elements in conjunction with discrete solid state switching elements to gain the advantages and substantially avoid the disadvantages of the electromechanical proportional type control devices and the solid state on-off devices. By the use of the differential input integrating amplifiers, proportional weighting is achieved through signal integration without the use of heavy and expensive special relays. These and other features and advantages of this invention are disclosed and described below.

BRIEF DESCRIPTION OF THE DRAWINGS

FIG. 2 is a schematic representation of the field excitation control section and paralleling section of the system;

FIGS. 3A through 3F are diagrams of input and output voltage wave forms as they occur under different operating conditions in the field excitation control circuit of FIG. 2;

DESCRIPTION OF THE PREFERRED EMBODIMENTS

Figure 1:
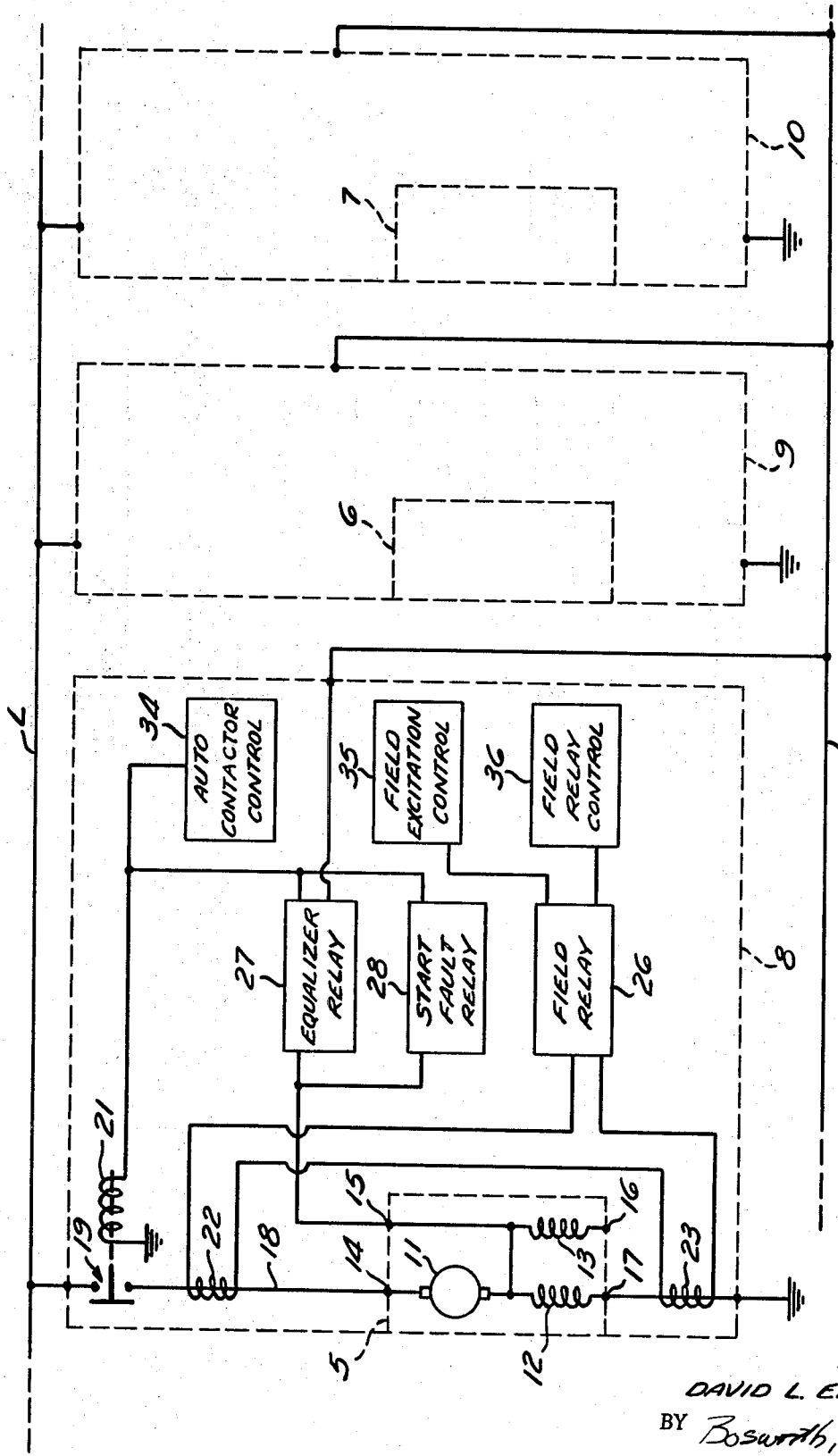
FIG. 1 illustrates in combined schematic and diagrammatic form a parallel D.C. generator system and the control and protection system of this invention and the overall relationship between them.

A preferred form and embodiment of this invention and its relationship to a typical D.C. generator and a parallel D.C. generator system is depicted in FIG. 1. Broken outline boxes 5, 6, and 7 represent a plurality of identical local D.C. generators; and, broken outline boxes 8, 9, and 10, respectively, represent identical control and protection panels embodying this invention and associated with the generators. Local generators 5, 6, and 7 are each connected in parallel with each other to main bus L and, through their associated control and protection panels, to equalizer bus E. Since the generators and their associated control and protection panels are the same, only local generator 5 and its associated panel 8 are shown in schematic and diagrammatic detail. It will be understood that any number of such generators and control and protection panels may be connected together in the manner shown to main bus L and equalizer bus E.

Local generator 5 includes an armature 11, an interpole winding 12, and a shunt field winding 13. Local generator 5 is provided with generator terminals 14 and 15, shunt field terminal 16 and neutral terminal 17, the latter being grounded.

Armature 11 is connected by means of line 18 to one terminal of main contactor 19. The other terminal of contactor 19 is connected to load bus L. Main contactor 19 is actuated by coil 21. In a typical installation, generator 5 may be located a significant distance from main contactor 19.

A current transformer indicated generally at 22 is inductively associated with line 18 as near as practicable to main contactor 19. Another current transformer indicated generally at 23 is connected as near as possible to the neutral terminal side of local generator 5. The secondary windings of the two current transformers 22 and 23 are connected in series opposing and to ground fault sensing circuitry of the field trip control circuit as described more fully below. Other local D.C. generators 6 and 7 are connected in the same fashion to load bus L and thereby in parallel with local generator 5.

In addition to main contactor 19, there are three switching relays associated with generator 5 and which comprise conventional elements of the control and protection system included generally within broken outline box 8. They are the field relay 26, equalizer relay 27 and start fault relay 28. Field relay 26 is a latching relay having two separate coils, a trip coil and a reset coil 30 and 31, respectively. When field relay 26 is operated, it connects shunt field 13 to its source of excitation and also provides a means for energizing the actuating coils of main contactor 19 and equalizer relay 27. When field relay 26 is tripped, local generator 5 is de-energized and disconnected from the parallel system.

Equalizer relay 27 has an actuating coil 32 connected to be energized with main contactor actuating coil 21. Equalizer relay 27 connects terminal 15 of local generator 5 through equalizer bus E to the corresponding armature terminals of other generators with which generator 5 is connected in parallel. The equalizer bus E interconnection provides means to determine the relative amount of current supplied by the local generator 5 and the other generators 6 and 7 connected to the equalizer bus. Generator terminal 15 of local generator 5 is a convenient point for sensing the amount of load supplied by the generator as will be more fully disclosed hereinafter.

Start fault sensing relay 28 provides a path for detecting a local ground fault before the local generator 5 is connected to main bus L and operates as described more fully below.

The system for controlling and protecting a typical local generator and associated switching relays such as generator 5 and relays 26, 27, and 28 described above must perform a number of control functions. The control system must determine, for example, the appropriate time to connect the local generator to the main bus. To to so, the controls must determine that there is no appreciable voltage difference between the main bus and the local generator. Once the generator is connected, it must be determined that the generator is supplying current to the load and not taking current from the load bus. It must also be determined that the local generator is supplying its share of the current supplied by all the generators on the line. The output voltage level of the local generator must also be maintained at a predetermined desired level. The control panel must sense fault conditions such as a local ground fault; i.e., a ground fault on the generator side of its associated main contactor connecting it to the main bus. Such a fault causes the generator to supply a large amount of current to the fault instead of to the main bus. Likewise, a remote ground fault on the main bus causing the entire generator system to supply current to that ground fault instead of to the proper load must be sensed and the appropriate action taken. Numerous other conditions and faults may arise which require automatic sensing and control action from the control circuits.

The functions described above and other functions are performed in a reliable and advantageous manner by the preferred form of control and protection panel 8 described below and comprising three principal control sections which interact together and with local generator 5 and its associated switching relays. These sections are the automatic contactor control 34, the field excitation control 35, and the field relay control 36. In FIG. 1, these control sections are shown in block form within control and protection panel 8. They are shown in detail in other figures of the drawings and each is fully described below in connection with them.

All power to the principal sections of the D.C. generator control panel is supplied by its associated local D.C. generator.

FIELD EXCITATION CONTROL CIRCUIT

FIG. 2 is a schematic diagram of a preferred form of field excitation control section 35 in detail and in connection with local generator 5 shown in FIG. 1 and described above. Power for this section, as well as all sections of the control and protection panel, is supplied by the associated local generator. In FIG. 2, a positive bus 38 is connected to generator terminal 14 and a grounded bus 39, to neutral terminal 17. Control section 35 comprises an integrated circuit linear operational amplifier 40 connected as a differential switch amplifier and having a summing input 41, a reference input 42, and an output 43. Broadly, operational amplifier 40 controls the conductive state of a transistor switch controlling the connection of shunt field 13 of generator 4 across generator terminals 14 and 15 and thus the field excitation of the generator. Operational amplifier 40 responds to voltages applied to its inverting and non-inverting inputs as described more fully below.

Operating power is supplied to operational amplifier 40 in a conventional manner by connection to positive bus 38 and grounded bus 39. The gain and biasing of operational amplifier 40 are such that it operates as a bistable device providing a substantially square-wave output. Summing input 41 is an inverting input with respect to output 43. Reference input 42 is a non-inverting input which is connected to a source of reference voltage $E_R$ as shown. Operational amplifier 40 is triggered to one of the stable states providing a more positive voltage at output 43 whenever the voltage at summing input 41 is less than the voltage $E_R$ at reference input 42. When the voltage at summing input 41 is greater than the reference voltage $E_R$ at input 42, amplifier 40 assumes its less positive output state.

Output 43 of operational amplifier 40 is connected through the series combination of Zener diode 44 and resistor 45 to the base 46 of PNP transistor 48. Base 46 is also connected through resistor 47 to positive bus 38. Emitter 49 and collector 50 of transistor 48 are connected to positive bus 38 and grounded bus 39, respectively, the latter through resistor 51.

Shunt field winding 13 of local generator 5 is excited from generator terminal 14 through the collector-emitter circuit of PNP transistor 53 of the Darlington-connected pair 52 and 53. The collector 55 of transistor 53 is connected to contact 56 of field relay 26 and thereby to shunt field terminal 16.

The network described above and connected to output 43 of operational amplifier including transistor 48 and Darlington-connected pair of transistors 52 and 53 function to connect and disconnect shunt field 13 and generator terminal 14 of local generator 5 in accordance with the stable state assumed by operational amplifier 40. When the output of operational amplifier 40 is more positive, conduction by Zener diode 44 is blocked and transistor 48 is held non-conducting by the resulting positive voltage level at its base 46. When transistor 48 is blocked, Darlington pair 52 and 53 conducts and shunt field 13 is excited from generator terminal 14 of its local generator 5. When the output of operational amplifier 40 is less positive, Zener diode 44 conducts, providing a lower voltage level at base 46 and permitting transistor 48 to conduct. When transistor 48 conducts, Darlington pair 52 and 53 is held non-conducting and shunt field 13 is disconnected from generator terminal 14. A return diode 57 is connected in parallel with shunt field 13 as shown to provide a path for an induced current to circulate when excitation of the shunt field is removed.

The voltage at summing input 41 is the sum of three voltages introduced through resistors 58, 59, and 60 as shown in FIG. 2. The sum of the voltages at these three inputs determines whether or not the voltage level at summing input 41 is lower or higher than the level $E_R$ at reference input 42. The voltages applied to summing input 41 through resistors 58 and 59 may be considered primarily as voltage regulator signals while the input through resistor 60 is a load regulation signal.

The voltage coming to summing input 41 through resistor 59 is obtained by sampling the local generator voltage directly through a voltage divider arrangement of resistors 61, 62, and 63 connected across positive bus 38 and grounded bus 39.

The voltage supplied to summing input 41 through resistor 58 has a saw-tooth waveform delivered from emitter 64 of unijunction transistor 66. Unijunction transistor 66, resistor 67 and capacitor 69 comprise an oscillator providing a saw-tooth waveform output. Unijunction transistor 66 is a negative resistance device in that over a portion of its operating range when the emitter to base $b_1$ current increases, the voltage from emitter to base $b_1$ decreases. In the circuit shown, capacitor 69 charges through resistor 67 from bus 38 until the negative resistance region of unijunction transistor 66 is reached. Base $b_2$ is connected to a regulated voltage supply network comprised of resistor 70 and voltage reference diode 71. At this point, unijunction transistor 66 conducts and the voltage from emitter to base $b_1$ drops sharply. Capacitor 69 is then discharged through unijunction transistor 66. The saw-tooth waveform provided by the charge and discharge of capacitor 69 is coupled to summing input 41 through voltage division network comprised of resistors 68a and 68b, and through capacitor 72, thereby removing the D.C. level. The frequency of the oscillator output depends upon the time constant of the RC combination, the voltage level of the bus, and is preferably relatively high; e.g., about one kilocycle.

The signals applied to summing input 41 from resistors 58 and 59 consists of a voltage proportional to the output of generator 5 on which is superimposed the zero-referenced saw-tooth waveform from the unijunction transistor 66 oscillator. The negative portions of the saw-tooth component of this combined signal cause the voltage level at summing input 41 to fall below the level of reference input 42, triggering operational amplifier 40 to its higher voltage output stable state. This turns on transistors 52 and 53 and injects a pulse of excitation current into shunt field winding 13 of local generator 5. Under normal operating conditions, the output voltage of local generator 5 will be such that the generator output-proportional voltage at summing input 41 will be slightly greater due to the superimposition of the saw-tooth waveform than the voltage at the reference input 42.

The operation of the field excitation control element of the system under three different operating conditions is illustrated in FIG. 3 of the drawings. FIG. 3A shows voltage waveforms of the summing input 41 and the reference input 42 and FIG. 3B shows the corresponding voltage waveform at output 43 of operational amplifier 40. In FIG. 3A, line 73 represents the voltage level at reference input 42. Line 74 represents the output-proportional D.C. voltage at summing input 41 on which is superimposed A.C. saw-tooth signal 75 from unijunction transistor 66 oscillator. The output voltage of the local generator is substantially greater than the reference level. Whenever saw-tooth signal 75 drops below the reference level 73, operational amplifier 40 causes Darlington pair 52 and 53 to conduct; and, when saw-tooth signal 75 rises above reference level 73, operational amplifier 40 causes Darlington pair 52 and 53 to turn off. FIG. 3B illustrates the waveform 76 at the output of operational amplifier 40 which corresponds to the inputs illustrated in FIG. 3A. Field winding 13 receives excitation current during the positive portions of waveform 76.

FIGS. 3C and 3D illustrate waveforms corresponding to those in FIGS. 3A and 3B but when the output voltage of the local generator is almost equal to the desired or reference level. The corresponding output waveform of FIG. 3D shows that shunt field winding 13 receives longer current pulses, thereby increasing the excitation to local generator 5.

As the voltage level represented by line 74 falls below the reference level depicted by line 73, the duty cycle of excitation pulses exceeds fifty percent and approaches the condition of constant excitation. The input and output voltage waveforms corresponding to this operational condition are shown in FIGS. 3E and 3F, respectively.

The duty cycle and level of excitation for a given generator may also be controlled by changing the slope and amplitude of saw-tooth signal 75.

Through the use of pulse width modulated control of the excitation means, voltage regulation is accomplished in an improved and in a smooth and efficient manner with a minimum of overshoot and oscillation or hunting of the output voltage of the local generator.

In previous on-off type voltage regulators, the relative direction of the on and off states of the field excitation means was determined solely by the output level of the generator relative to the desired level. In such a case, the local generator would call for excitation or no excitation at its inherent speed of response to the excitation. An on-off frequency of the excitation means was thus established corresponding to the natural resonant response frequency of the local generator. This frequency was normally much lower than the preferred frequency of the saw-tooth function signal described above in connection with this invention and, therefore, regulation of the output voltage was not as smooth as that possible with controls embodying this invention. This phenomenon is an even greater problem when generators are used in parallel. When two or more generators controlled in the prior art fashion described above are paralleled to the same load, their normally different inherent speeds of response to excitation cause a load unbalance which oscillates and beats between the generators. Each paralleled generator effectively overshoots its varying share of the load in both directions.

In a parallel system of generators and controls embodying this invention, that problem is solved by having the generators excited by pulses of current preferably at a rate of approximately one thousand cycles per second. The rate of excitation is constant and the same for all generators and is much higher than the natural response frequency of the local generators. At this higher rate, the generators have a substantially reduced time to overshoot and the electromagnetic and mechanical systems of the local generator cannot over-respond to it. Also, as previously described, diode 57 tends to maintain a smooth flow of current through field winding 13 by providing a path for the current induced in field winding 13 during the off time of the excitation means.

The third input through resistor 60 to summing input 41 of operational amplifier 40 is for the purpose of load equalization between local generator 5 and the other generators on the line. This input is provided by an operational amplifier 77 which detects differences, if any, in the amount of load being supplied by local generator 5 and the other generators on the line. Operational amplifier 77 is connected as a modified differential amplifier having feedback paths through resistor 78 and its parallel-connected bypass capacitor to its inverting input 79, and through resistor 92 and its parallel-connected bypass capacitor to its non-inverting input 81 from reference voltage source $E_R$. Operational amplifier 77 also has an inverting input resistor 80 and a non-inverting input 81 and input resistor 82. Inputs 79 and 81 are tied through their respective input resistors to the opposite ends of a resistor 83 inserted in series between generator terminal 15 of local generator 5 and equalizer bus E. Connection to equalizer bus E is made through contact 84 of equalizer relay 27.

The relative amounts of current being supplied by local generator 5 and the other paralleled generators are determined by comparing the voltage appearing at terminal 15 with the voltage appearing at corresponding terminals of the other paralleled generators. As increasing current is supplied by local generator 5, for example, to load bus L, the voltage at generator terminal 15 becomes increasingly negative with respect to neutral terminal 17. By connecting the resistor 83 between generator terminal 15 and the equalizer bus E, the magnitude and polarity of any difference in voltage between terminal 15 and the equalizer bus is sensed across resistor 83. Resistor 93 provides decoupling of Zener diode 85 from terminal 15 of the generator.

The voltage level at terminal 15 of the generator, however, is below the common mode input range of operational amplifier 77. In order to raise the common voltage level at resistor 83 to the voltage level required by the input of operational amplifier 77, Zener diodes 85 and 86 are connected in series with resistors 87 and 88, respectively, and to positive bus 38. Zener diodes 85 and 86 have identical values of Zener voltage so that the voltage across resistor 83 is transferred to the input resistors 80 and 82 of operational amplifier 77 with its relative magnitude and polarity preserved, but transformed in level to the operating range of operational amplifier 77. The output voltage of operational amplifier 77 appearing at 89 and through filter network resistor 94 and capacitor 95 comprises the third signal for the summing input of operational amplifier 40 described above. This filtered output is connected by line 91 to input resistor 60 at summing input 41. Output at line 91 is also connected through equalizer relay contact 90 to A—A in FIG. 5 described below in connection with the protection circuit.

In operation, if local generator 5 provides more than its share of current to load bus L, the voltage at generator terminal 15 will be more negative than the voltage at the equalizer bus E. This voltage difference will be developed across resistor 83 and transferred to the input resistors 80 and 82 of operational amplifier 77. The voltage at inverting input 79 will be negative with respect to the voltage at non-inverting input 81, causing output voltage at 89 of operational amplifier 77 to go positive. The preferable ratio of values of resistors 78 and 80 is such that the gain of operational amplifier 77 is nominally fifty. The positive signal appearing at output 89 is then transmitted through resistor input 60 to summing input 41 of operational amplifier 40 where it is algebraically combined with the D.C. input that is proportional to local generator 5 output and with the saw-tooth function signal described above. The D.C. voltage level at summing input 41 thus tends to become more positive with respect to the voltage at reference input 42, thereby decreasing the width of each pulse of excitation current transmitted to field winding 13 in the manner described above in connection with FIGS. 3A and 3F. The excitation to field winding 13 is thus decreased and the load carried by local generator 5 is reduced to the level of load carried by the other parallel generators.

If the voltage at terminal 15 of local generator 5 is positive with respect to the voltage at equalizer bus E, the voltage developed across resistor 83 makes inverting input 79 of operational amplifier 77 positive with respect to non-inverting input 81. As a result, output 89 of operational amplifier 77 goes negative and causes the voltage level at summing input 41 of operational amplifier 40 to go more negative with respect to reference input 42. As described above, such a change in the relationship of the levels of the D.C. input and the reference input increases the width of the excitation pulses. Field winding 13 receives longer pulses of current at the one thousand cycle per second rate, thereby increasing the level of field excitation to local generator 5. Local generator 5 will thus tend to contribute more current to load bus L.

From the foregoing, it is apparent that operational amplifier 77 and its associated circuitry attempt to sum to zero the voltage difference between terminal 15 of local generator 5 and the equalizer bus E.

Another feature of this invention is embodied in the field excitation control circuit described above and shown in FIG. 2. This feature includes means to insure that local generator 5 under control of the field excitation circuit is fully and continuously excited to the extent of its output in the event its output voltage is pulled down by a fault or other cause to and below the level required to operate the control circuitry. As long as the output voltage of the generator remains high enough to operate the control circuitry, the field excitation is controlled by the circuit in the manner described above. Such an operating characteristic is normally preferred in aircraft D.C. generator power system as well as other systems.

Referring to FIG. 2, this failure condition operating characteristic is provided by Zener diode 44 connected in series with resistors 45 and 47 between the output of operational amplifier 40 and the generator output as it appears at positive bus 38. As described above, the conducting state of Zener diode 44 controls the excitation of field 13 of the generator through connection of base 46 of transistor 48 to the junction of resistors 45 and 47. When Zener diode 44 conducts, field 13 is de-energized; when Zener diode 44 blocks, field 13 is excited. Zener diode 44 conducts when the voltage applied to its cathode from the output of the generator through positive bus 38 and resistors 45 and 47 exceeds the voltage applied to its anode by operational amplifier 40 by an amount greater than the Zener voltage of the diode.

The Zener diode is selected so that, under normal operating conditions with the generator output voltage maintained at or near the reference voltage $E_R$ and no substantial faults present tending to pull down the output voltage, conduction of the diode is controlled by the stable state of operational amplifier 40. When the output of operational amplifier 40 is less positive, the difference between it and the substantially fixed generator output voltage exceeds the Zener voltage of diode 44 and it conducts. When operational amplifier 40 is in its other stable state providing a more positive output, the applied voltage difference across Zener diode 44 is less than its Zener voltage and it blocks.

Under large fault conditions which drag the generator output voltage down below the level required to operate operational amplifier 40 and the control circuitry, operational amplifier 40 provides a less positive output which normally calls for de-energization of the generator field, or the opposite of the desired function under the fault conditions. As the generator output voltage is brought down by the fault, however, the difference between it and even the operational amplifier's less positive output voltage falls below the Zener voltage of Zener diode 44 and field 13 of the generator is now continuously excited to the extent possible by the declining or reduced generator output. Thus, the advantage of this preferred operating characteristic for a large fault current condition is provided by this invention as embodied, for example, in the circuit of FIG. 2.

AUTOMATIC LINE CONTACTOR CONTROL CIRCUIT

Figure 4:
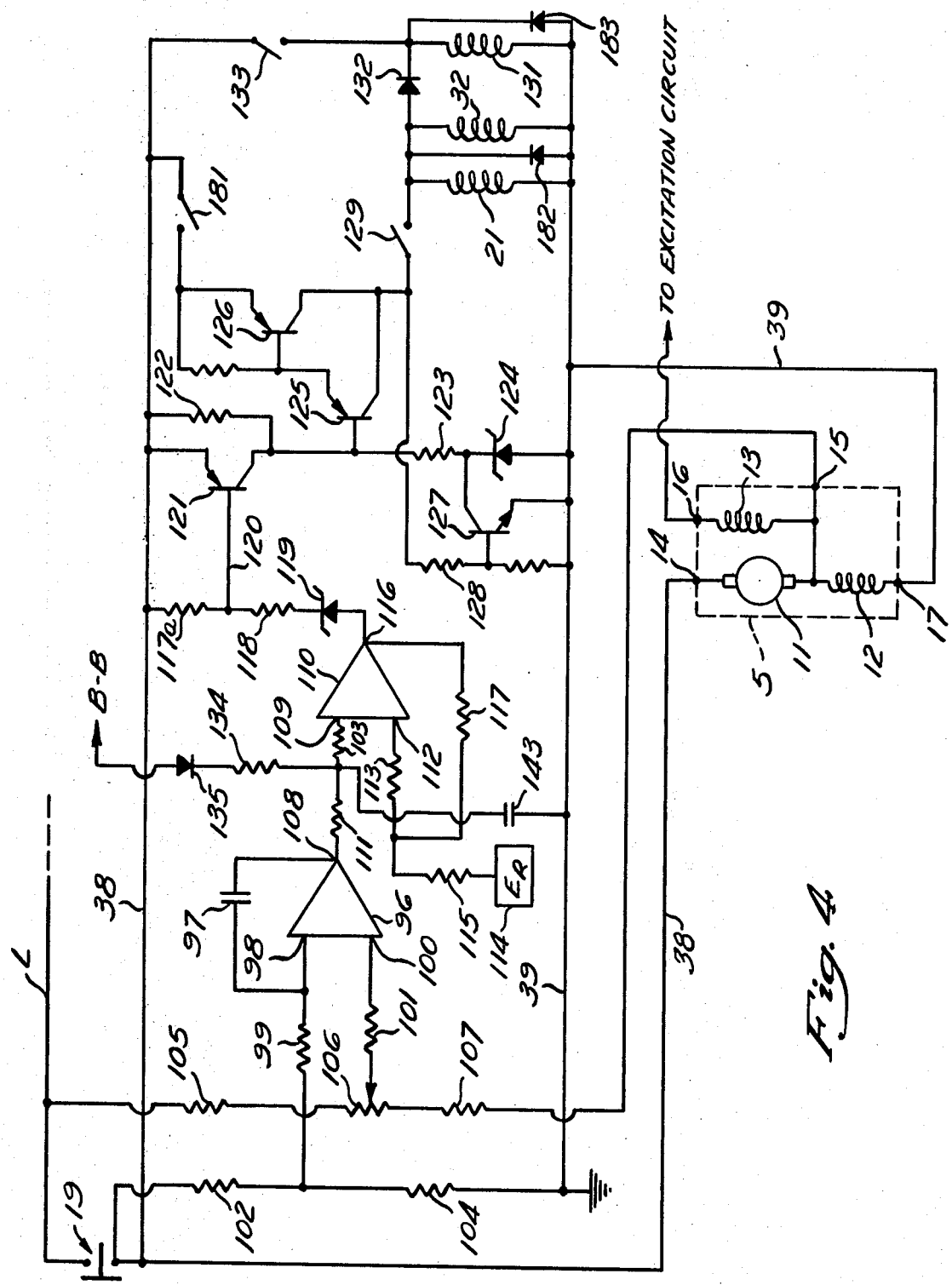
FIG. 4 is a schematic diagram of the automatic line contactor control section of the system.

FIG. 4 illustrates in schematic form a preferred embodiment of the automatic line contactor control circuit of this invention connected in operating relationship to local generator 5. Broadly, the function of the automatic line contactor control circuit is to control the flow of current to line contactor coil 21 and equalizer relay coil 32, thereby controlling the connection of local generator 5 to load bus L and to the equalizer bus E. Local generator 5 must be connected to or disconnected from load bus L and equalizer bus E at various times and for various reasons as will be more fully discussed below.

In FIG. 4, the automatic line contactor control circuit comprises an operational amplifier 96 connected as an integrator having a feedback capacitor 97, inverting input 98 and resistor 99, and non-inverting input 100 and resistor 101. Inverting input 98 is shown monitoring the output voltage of generator 5 through voltage dividing resistors 102 and 104 connected in series between the point of regulation, as shown, and neutral terminal 17. Non-inverting input 100 monitors the voltage between load bus L and generator terminal 15 of local generator 5 through voltage-dividing resistors 105, 106, and 107.

During build up of local generator 5, main actuator 19 and equalizer relay 27 are open, isolating local generator 5 from load bus L and equalizer bus E. Before main contactor 19 is allowed to close connecting local generator 5 to load bus L, the automatic line contactor control circuit must determine that the output voltage of local generator 5 is either greater than, or only very slightly less than, the voltage on load bus L so that local generator 5 can supply current to load bus L instead of taking current from it. This determination is accomplished and indicated by operational amplifier 96 as described below.

When main contactor 19 is open and local generator 5 is not supplying the load, the generator delivers only enough current to energize its associated control circuitry. This is a relatively small amount of current. As a consequence, the voltage at terminal 15 of local generator 5 will then be very close to ground potential. In such case, non-inverting input 100 effectively monitors the voltage level above ground of load bus L. Inverting input 98 monitors the output voltage of local generator 5. A voltage proportional to the difference between local generator 5 output and load bus L appears then between the inverting and non-inverting terminals 98 and 100, respectively, of operational amplifier 96.

When the voltage at inverting input 98 becomes positive or only very slightly negative with respect to the voltage appearing at non-inverting input 100, operational amplifier 96 begins to integrate in the negative direction and continues to integrate in the negative direction as long as this input voltage relationship exists. The slope of the output signal is determined by the time constant of feedback capacitor 97 and inverting input resistor 99 and filter network resistor 111 and capacitor 143 and the magnitude of the voltage difference at the inputs.

The output 108 of operational amplifier 96 is coupled to the summing and inverting input 109 of operational amplifier 110 through resistors 111 and 103. Resistor 134 and diode 135 are returned to terminal 160 of amplifier 161 in FIG. 5. Operational amplifier 110 is connected to operate as a bistable device. Non-inverting input resistor 113 is connected to a voltage reference 114 through resistor 115 and to output 116 of operational amplifier 110 through resistor 117 in the feedback connection. Feedback resistor 117 functions to supply positive feedback to non-inverting input 112, thereby enhancing the step function output response of operational amplifier 110. Output 116 of operational amplifier 110 is connected to the base of transistor 121 through the series combination of resistor 118 and Zener diode 119. Transistor 121 responds to the conductive state of Zener diode 119 in the same fashion as transistor 48 in the field excitation control circuit described above in connection with FIG. 2. The base 120 of transistor 121 is also connected to load bus L through a bleeder resistor 117a. The collector of transistor 121 is tied to ground through the series combination of resistor 123 and Zener diode 124. A bypass to ground around Zener diode 124 is provided by NPN transistor 127. The collectors of transistors 125 and 126 are connected through resistor 128 to the base of transistor 127 for controlling its conductive state. Transistor 121 is connected to and controls the conductive state of a Darlington-connected pair of PNP transistors 125 and 126.

Positive bus 38 is connected to or disconnected from actuating coil 21 of main contactor 19 and through it to ground by the switching operation of PNP transistor 126 and contact 129 of field relay 26, and manual control switch 181. When transistor 126 conducts and contact 129 and switch 181 are closed, actuating coil 21 of main contactor 19 is energized. When either or both transistor 126 and contact 129 are open, actuating coil 21 is de-energized. Opening of manual switch 181 will also result in the de-energization of actuating coil 21 of the line contactor. Actuating coil 32 of equalizer relay 27 is connected directly in parallel with actuating coil 21 and with a bypass diode as shown. Actuating coil 131 of start fault relay 28 and its associated bypass diode 183 are also connected in parallel through a blocking diode 132 which functions with contact 133 of start fault relay 28 to lock in relay 28 from positive bus 38 without energizing coils 32 and 21.

In operation, when the output voltage of operational amplifier 96 causes the voltage level at the inverting input 109 of operational amplifier 110 to become more negative than the voltage level at noninverting input 112, the output of operational amplifier 110 will be a positive-going step function blocking Zener diode 119 which, in turn, turns off transistor 121. When transistor 121 turns off, the voltage at the collector of transistor 121 becomes less positive, thereby turning on Darlington pair 125 and 126 and allowing the base current of transistor 125 to flow to ground through resistor 123 and Zener diode 124. When Darlington pair 125 and 126 is caused to conduct, the voltage level appearing at its collectors causes transistor 127 to conduct, thereby short circuiting Zener diode 124 and cutting it off. Transistor 127 also provides a path for the base current of transistor 125, thereby tending to hold the Darlington pair conducting. When Darlington pair 125 and 126 is conducting, current flows through contact 129 of field relay 26 to energize coil 21 of line contactor 19, coil 32 of equalizer relay 27 and coil 131 of start fault relay 28 which locks in through its own contact 133. Main contactor 19 and equalizer relay 27 are thus caused to connect local generator 5 to load bus L and to the equalizer bus E when the generator output voltage at inverting input 98 of operational amplifier 96 equals or is only slightly less negative than the load bus L voltage sensed by noninverting input 100.

Once main contactor 19 is closed and local generator 5 connected to load bus L, operational amplifier 96 and its associated circuitry perform the function of detecting reverse current through local generator 5. Ideally, when local generator 5 is connected to load bus L, there is no voltage difference existing between load bus L and output terminal 14. Under normal circumstances, the field excitation control circuit equalizes any difference in the load shared between local generator 5 and the other parallel generators on the line as explained above. If local generator 5 does become a load on the load bus L, however, it is desirable to take it off the line. This function is accomplished in the following manner.

Current supplied or taken by local generator 5 causes a corresponding voltage drop across interpole winding 12. The magnitude and direction of current supplied or taken by local generator 5 may thus be determined by monitoring the magnitude and polarity of the voltage level appearing at terminal 15 of local generator 5. As described above, when operational amplifier 96 is operating to sense the voltage difference between load bus L and the output of local generator 5 for automatic line contractor control, the voltage appearing at terminal 15 is essentially ground potential. In the reverse current sensing mode, the voltage of the load bus L and of local generator 5 are normally equal; but, should there be reverse current flowing through the interpole winding 12, the voltage appearing at terminal 15 becomes positive with respect to ground, causing an increase in the voltage level at noninverting input 100 of operational amplifier 96 with respect to inverting input 98. The output of operational amplifier 96 will then begin to integrate in the positive direction at a rate determined by the time constant of capacitor 97 and resistor 99, and filter resistor 111 and capacitor 143, and the magnitude of the differential input signal.

When the voltage at inverting input 109 from the output 108 of operational amplifier 96 becomes more positive than the reference voltage at noninverting input 112 from voltage reference 114, the output of operational amplifier 110 will be a negative-going step function permitting Zener diode 119 to conduct which, in turn, causes transistor 121 to conduct through transistor 127. Darlington pair 125 and 126 is then cut off which, in turn, cuts off transistor 127, causing Zener diode 124 to conduct current from transistor 121. When Darlington pair 125 and 126 stop conducting, actuating coil 21 of main line contactor 19 and actuating coil 32 of equalizer relay 27 will no longer be energized causing main contactor 19 and equalizer relay 27 to open. Contact 129 of field relay 26 remains closed so long as field relay 26 is not tripped as will be discussed more fully below. In this manner, generator 5 is removed from the line and will remain off the line until the desired relationship between the generator output voltage and the load bus voltage is reestablished.

Start fault relay 28 is energized through its own contact 133 and will release only when the output voltage of local generator 5 falls below the hold-in current of coil 131. Diode 132 isolates coil 21 of main contactor 19 and coil 32 of equalizer relay 27 from the output of local generator 5. The function of start fault relay 28 is to provide a path for detecting local ground faults before local generator 5 has been connected to load bus L so that such connection can be prevented until the local ground fault is cleared. This operation will be described more fully below.

The summing and inverting input 109 to operational amplifier 110 has an additional input through resistor 134 and diode 135 from the start ground fault sensing portion of the field relay trip control circuit. In the event of a local ground fault prior to closing of main contactor 19, this input operates to keep local generator 5 disconnected from load bus L by preventing main contactor 19 and equalizer relay 27 from closing as will be more fully discussed below. It will be noted that a local ground fault will cause current flow through interpole winding 12 to drive operational amplifier 96 into its less positive state. Such an output, in turn, tends to cause second-stage operational amplifier 110 to make Darlington pair 125 and 126 conduct and close the main contactor 19. Since it is undesirable to put a local generator with a local ground fault in its local network to the line, the additional input signal to inverting input 109 is provided from the ground fault sensing section of the system.

It will be noted that Zener diode 119 functions to provide a fail-safe type of operating characteristic to the automatic line contactor control circuit of FIG. 4 and which is similar to the operating characteristic provided by Zener diode 44 in the field excitation control circuit previously discussed. When local generator 5 is connected to load bus L, a remote ground fault can cause the load bus voltage to fall below the level required for normal operation of the control circuits. In such a case, Zener diode 119 will hold transistor 121 in the off state, thereby causing Darlington pair 125 and 126 to conduct and hold main contactor 19 and equalizer relay 27 energized. Local generator 5 thus is locked onto load bus L to assist the other paralleled generators in burning out the remote ground fault.

Zener diode 124 also provides a fail-safe type operating characteristic but does so in the opposite case from that in which Zener diode 119 functions. If local generator 5 is tripped off the load bus L because of some fault, Zener diode 124 prevents Darlington-connected transistors 125 and 126 from conducting and connecting local generator 5 to load bus L until the output voltage of local generator 5 is at least equal to the Zener voltage of Zener diode 124. From the foregoing description of the circuit of the line contactor control, it will be apparent that, if the output voltage of local generator 5 is below the Zener voltage of Zener diode 124, transistors 125 and 126 are prevented from conducting for lack of a base current path from Darlington pair 125 and 126 unless transistor 127 is caused to conduct. However, Darlington pair 125 and 126 must conduct in order to turn on transistor 127. Darlington pair 125 and 126 is thus held in the non-conducting state, holding local generator 5 off load bus L until the local generator output voltage at least equals the Zener voltage of Zener diode 124.

Thus, there as at least two operating conditions that must be satisfied before local generator 5 can be connected to load bus L by main contactor 19. First, the output voltage of local generator 5 must be substantially equal to the voltage of load bus L; and, second, the output voltage of local generator 5 must be at least equal to the Zener voltage of Zener diode 124. As a consequence, when a voltage-reducing fault occurs, Zener diodes 119 and 124 hold main contact 19 in its condition at the time of the fault and until the fault is corrected. Lastly, local generator 5 cannot be connected to load bus L if a local ground fault exists provided the ground fault signal is furnished inverting input 109 of second-stage operational amplifier 110 as shown in the circuit drawing.

FIELD RELAY TRIP CONTROL CIRCUIT

Figure 5:
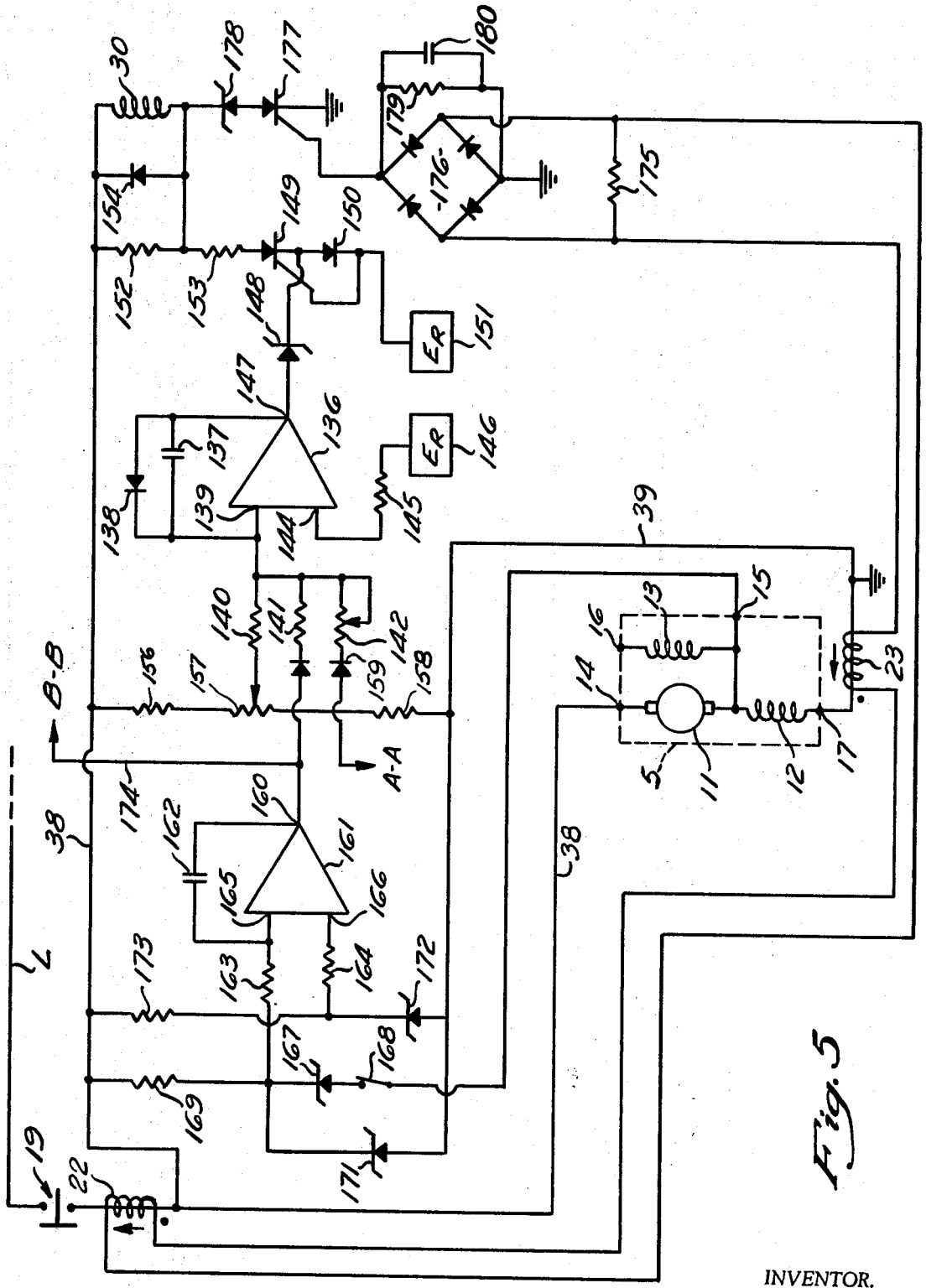
FIG. 5 is a schematic diagram of the field relay trip control section of the system.

FIG. 5 illustrates in schematic form a preferred embodiment of the field relay trip control circuit of this invention in its operational relationship to local generator 5. Broadly, the function of this circuit is to trip field relay 26 in the event that a malfunction of some type occurs. Field relay 21 is a latching type relay having a reset coil 31 and a trip coil 30. The field relay trip control circuit controls the energization of field relay trip coil 30. When field relay 26 is tripped, shunt field winding 13 of local generator 5 is disconnected from its source of excitation, and main contactor 19, equalizer relay 27 and start fault relay 28 are de-energized, causing local generator 5 to be completely disconnected from the parallel generator system.

In FIG. 5, operational amplifier 136 is connected as an integrator having feedback capacitor 137 and feedback diode 138. Connected to summing and inverting input 139 are summing input resistors 140, 141, and 142; and connected to non-inverting input 144 through resistor 145 is reference voltage 146. Feedback diode 138 serves as a clamp, allowing operational amplifier 136 to integrate only in the negative direction. When the voltage level at the inverting input 139 of operational amplifier 136 becomes more positive than the reference voltage level at non-inverting input 144, the output of operational amplifier 136 begins to integrate in the negative direction. The rate of integration depends upon the time constant of feedback capacitor 137 and summing input resistors 140, 141, and 142 and upon the magnitude of the input voltage. If the summed voltage level at inverting input 139 continues to be more positive than the reference voltage level at non-inverting input 144, the output of operational amplifier 136 continues to integrate in the negative direction until the anode voltage applied to Zener diode 148 is lowered enough to reach its Zener voltage and render Zener diode 148 conducting. Feedback and Zener diodes 138 and 148, respectively, effectively define the limits of integration of operational amplifier 136.

Output 147 of operational amplifier 136 is connected to the anode of Zener diode 148, and the cathode of diode 148 is connected to the cathode of a silicon controlled rectifier 149. The cathode is also connected through a blocking diode 150 to a voltage reference source 151. The gate of SCR 149 is tied to source 151 on the cathode side of blocking diode 150. The anode of SCR 149 is connected to the positive bus 38 through resistors 152 and 153 and trip coil 30 of field relay 26 as shown. A free-wheeling bypass diode 154 is provided for trip coil 30.

When Zener riode 148 conducts, the voltage level at the cathode of SCR 149 falls below the gate voltage, thereby causing SCR 149 to conduct through Zener diode 148. Current through SCR 149 energizes trip coil 30 of field relay 26, opening its contacts 56 and 129 (see FIGS. 2 and 4) and thereby disconnecting field winding 13 from its source of excitation and disconnecting local generator 5 from load bus L and from equalizer bus E. Field relay 26 must be reset by an operator to bring local generator 5 back into normal operation.

The signals to which operational amplifier 136 responds are applied through resistors 140, 141, and 142 and algebraically combined at inverting input 139. Resistor 140 is adjustably connected to resistor 157 of a series combination of resistors 156–158 comprising a voltage divider connected between positive bus 38 and ground.

The signal applied throug resistor 140 is proportional to the output voltage of local generator 5. Potentiometer resistance 157 is set so that, when the output voltage of local generator 5 exceeds a predetermined upper limit, the voltage level at inverting input 139 becomes more positive with respect to the voltage at non-inverting input 144, causing the output of operational amplifier 136 to integrate in the negative direction and resulting eventually in local generator 5 being tripped off load bus L. In this manner, operational amplifier 136 senses and provides protection against overvoltages not corrected by the field excitation control circuit.

Variable input resistor 142 is connected through blocking diode 159 to the equalizer section of the field excitation control circuit shown in FIG. 2. Connection is made to output 89 of differential operational amplifier 77 through contact 90 of equalizer relay 27. As described above, a positive signal from operational amplifier 77 indicates that local generator 5 is providing more than its share of current to load bus L. Under normal circumstances, load regulation is accomplished by the field excitation control circuit. However, if, because of some malfunction, operational amplifier 40 of the field excitation control circuit does not regulate the load in the normal manner as described above, the output voltage of operational amplifier 77 continues to rise, causing the voltage level at inverting input 139 of operational amplifier 136 to become more positive and eventually disconnecting local generator 5 from the parallel system. Thus, in the event of uncorrected overexcitation of local generator 5, operational amplifier 136 acts as auxiliary means to protect the local generator.

The signal to inverting input 139 of operational amplifier 136 through resistor 141 is, as shown in FIG. 5, from the output 160 of operational amplifier 161 which is connected as an integrator having feedback capacitor 162 and input resistors 163 and 164 to inverting input 165 and non-inverting reference input 166, respectively. Inverting input 165 and input resistor 163 are connected to generator terminal 15 of local generator 5 through Zener diode 167 and contacts 168 of start fault relay 28, and to a source of regulated voltage comprising resistor 169 and Zener diode 171, as shown in FIG. 5. Non-inverting input 166 and resistor 164 are connected to ground through Zener diode 172 and to positive bus 38 through resistor 173, all as shown in FIG. 5.

The function of operational amplifier 161 is to sense any local ground fault before local generator 5 is connected to load bus L. When such a local ground fault exists, local generator 5 tends to supply large amounts of current to the ground fault. The large amount of current supplied by local generator 5 will cause the voltage level at generator terminal 15 to go more negative with respect to ground. This voltage difference between generator terminal 15 and ground is sensed and integrated by operational amplifier 161. If this condition continues, the output of operational amplifier 161 continues to integrate in the positive direction making inverting input 139 of operational amplifier 136 more positive which will eventually trip field relay 26 and de-energize shunt field winding 13 of local generator 5.

In the inputs to operational amplifier 161, there are preferably provided Zener diodes 167 and 172 to raise the common level of voltage to the operating input level of operational amplifier 161 and to provide a predetermined voltage difference between the inputs. Since operational amplifier 161 will begin to integrate in the positive direction whenever the voltage level to inverting input 165 is more negative than the voltage level to non-inverting reference input 166, Zener diodes 167 and 172 are selected to allow for a predetermined amount of current to be supplied by local generator 5, and, therefore, a predetermined voltage difference between generator terminal 15 and ground, before input terminal 165 becomes negative with respect to input terminal 166. The Zener voltage of Zener diode 167 is thus chosen to be higher than the Zener voltage of Zener diode 172 by an amount equal to the voltage difference between generator terminal 15 and ground produced by a predetermined allowable amount of current flow through interpole winding 12. When the voltage drop exceeds this amount, however, the voltage level at inverting input 165 of operational amplifier 161 becomes negative with respect to the level of non-inverting input 166 and operational amplifier 161 integrates in a positive direction as intended.

The output of operational amplifier 161 is also fed through conductor 174 to the inverting input 109 of operational amplifier 110 of the automatic line contactor control circuit. As previously disclosed, this signal will lock out main contactor 19 and prevent the connection of local generator 5 to load bus L in the event of a local ground fault.

Contact 168 is a normally closed contact of start fault relay 28 which, as previously disclosed, is energized with the main contactor coil. When main contactor 19 is actuated by the automatic line contactor control circuit, start fault relay 28 will also be actuated, causing contact 168 to open so that operational amplifier 161 will no longer be adapted to respond to voltage difference between generator terminal 15 and ground.

Since operational amplifier 161 is no longer adapted to sense a local ground fault when local generator 5 is connected to load bus L, that function is now performed by current transformers 22 and 23 and their associated circuitry. In a typical use of the generator system herein discussed, each local generator 5 may be located physically a considerable distance from the point where it is connected by main contactor 19 to load bus L so that a considerable length of heavy cable is required. The cable can develop a short circuit and/or become grounded at any point along its route due to any of a number of causes. To monitor this cable for such local faults, current transformers 22 and 23 are inductively associated in the manner shown with the generator current path at widely spaced locations from each other and thereby provide a protected zone between them. In FIG. 5 of the drawings, the desired interconnection of the transformers is shown by the dot symbol convention applied to the secondary windings of current transformers 22 and 23 together with the arrows indicating direction of current flow in the primary or load current conductor. Current transformer 23 is placed to sense a change in the current in the return path to local generator 5 while current transformer 22 is placed to sense a change in the generator current at a point in the cable as near as possible to line contactor 19. Both current transformers 22 and 23 should sense the same amount of change. However, if some local fault has developed in the zone protected by current transformers 22 and 23, a current change occurs in one portion of the line which is not balanced by a corresponding current change in the other portion of the line. This unbalanced condition is sensed by the current transformer and translated into a differential voltage developed across resistor 175. Resistor 175 is connected across a rectifier bridge 176 which, in turn, provides a directed gate signal to SCR 177. The cathode of SCR 177 is connected to ground. Its anode is connected through Zener diode 178 to trip coil 30 of field relay 26. A differential voltage of either polarity appearing across resistor 175 is conducted by bridge 176 as a positive signal to the gate of SCR 177. If the signal is of sufficient magnitude, SCR 177 is gated on, tripping field relay 26 and disconnecting local generator 5 from the parallel system. Resistor 179 and capacitor 180 serve as a noise filter to prevent the turn on of SCR 177 by a spurious noise signal.

The foregoing description of a preferred embodiment of this invention is divided into sections and the embodiment, therefore, is treated in sections. This has been done this way as a convenience in presenting and describing the whole embodiment. The various sections or subcombinations work and operate together as an integrated whole. While the subcombinations themselves are novel and enjoy their own features and advatages as generator control and protection subcombinations for a parallel D.C. generator system, they are also novel when taken together and as a total system for controlling and protecting a parallel system of D.C. generators and, in their total combination, they enjoy various novel features and advantages as is pointed out in the foregoing description.

Those skilled in the art will appreciate that various changes and modifications can be made in the apparatus described herein without departing from the spirit and scope of the invention.

I claim:

1. Apparatus for controlling and protecting a D.C. generator connected in parallel with other D.C. generators to a main load bus and to each other through an equalizer bus, said controlled and protected D.C. generator having
an output terminal,
a grounded terminal,
an interpole winding having one end connected to said armature at a junction terminal and the other end to said grounded terminal,
a field winding terminal,
a field winding having one end connected to said junction terminal and the other end to said field winding terminal, and
an armature in circuit between said output terminal and said junction terminal, said controlled and protected D.C. generator having associated therewith
a main conductor with actuating coil to connect and disconnect said output terminal of said generator to and from the main bus,
an equalizer relay with actuating coil to connect and disconnect said junction terminal of said generator to and from the equalizer bus, and
a field relay having a reset coil to connect and a trip coil to disconnect said field winding terminal to and from said output terminal of said generator to energize and de-energize, respectively, said generator field, said apparatus comprising
means for sensing the output voltage level of said generator and providing an output voltage signal proportional thereto,
means for sensing the voltage of said main bus and providing a main bus voltage signal proportional thereto,
means for sensing current flow to and from said generator in said equalizer bus and providing an equalizer bus voltage signal proportional thereto,
means for sensing direction of current flow through said generator and providing a reverse current flow voltage signal proportional thereto, and
reference voltage means for providing a predetermined reference voltage signal, a field excitation control section comprising
first static means for algebraically combining said generator output voltage signal and said equalizer bus voltage signal and providing an output signal proportional to the combination, and
first static comparing and bistable switching means having a first input connected to the output of said first static means, and a second input connected to said reference voltage means, and having an output connecting said field winding and said generator output for controlling the energization of said field relay, said first comparing and bistable switching means being responsive to the relative levels of the output signal of said first static means and the reference voltage signal and assuming its first stable state energizing said field winding to excite said generator when the levels of the output signal of said first static means and said reference voltage differ in a first predetermined manner and assuming its second stable state de-energizing said field winding to prevent excitation of said generator when the levels of the output signal of said first static means and said reference voltage differ in a second predetermined manner, a main contactor control section comprising
first static integrator means having a differential input and responsive to input differences to provide an integrated output signal from the input differences,
means for providing said generator output voltage signal and said main bus voltage signal to said differential input of said first static integrator when said main contactor is open and disconnects said D.C. generator from said main bus, and for connecting the opposite ends of said interpole winding to said differential input of said first static integrator to indicate voltage differential across said interpole winding due to current flow therethrough when said main contactor is closed and connects said D.C. generator to said main bus, and
second static comparing and bistable switching means having a first input connected to the output of said first static integrator means and a second input connected to said reference voltage means and having an output and additional switching means responsive to said output for energizing and de-energizing said actuating coils of both said main contactor and said equalizer relay when said second comparing and bistable switching means is in one and the other of its bistable stated respectively, said second comparing and bistable switching means being responsive to the output signals of said first static integrator means whereby when said main contactor is open said second bistable means assumes said one of its stable states closing said main contactor and said equalizer relay when said output signal of said first static integrator indicates the generator output voltage and main bus voltage are substantially the same and assumes the other of said stable states preventing the closing of said main contactor and said equalizer relay when said output signal of said first static integrator indicates the generator output voltage and main bus voltage differ by a predetermined amount, and, further, whereby when said main contactor is closed said second bistable means assumes said one of its stable states maintaining said main contactor and said equalizer relay closed when current flow through said interpole winding is in the forward direction and assumes the other of said stable states opening said main contactor and said equalizer relay when current flow through said interpole winding is in the reverse direction, a fault protection section comprising second static integrator means having a differential input and responsive to input differences to provide an integrated output signal from the input differences, means for providing to said differential input of said second static integrator means a first input signal proportional to the voltage level of said generator output with respect to said generator grounded terminal, and a second input signal proportional to the voltage level of said generator output with respect to said junction terminal of said generator when said main contactor is open and disconnects said generator from said main bus, whereby said second static integrator means provides a first output signal proportional to current flow through said interpole winding and said generator when said generator is disconnected from said main bus, means providing said first output signal of said second static integrator means to said first input of said second static bistable comparing and switching means to prevent closing said main line contactor when current flow through said interpole winding exceeds a predetermined amount, second static means for algebraically combining said generator output voltage signal, said output signal of said second static integrator, and said equalizer bus voltage signal and providing an output signal proportional to the combination, third static comparing and bistable switching means having a first input connected to said second static means and a second input connected to said reference voltage means and having an output connected to energize said trip coil of said field relay to disconnect said field winding from the output of said generator and said generator from said main bus and said equalizer bus when said third bistable means is in one of its two stable states, said third bistable means being responsive to input signals whereby said trip coil is energized when said combination output signal of said static means exceeds said reference level by a predetermined amount.

2. In combination with a D.C. generator connected in parallel with other D.C. generators to a main bus and to each other through an equalizer bus, an automatic line contactor and reverse current flow sensing circuit for controlling the connection and disconnection of said D.C. generator to said main bus and said equalizer bus, said D.C. generator having an armature, an output terminal connected to one side of said armature, a grounded terminal, an interpole winding having one end connected to the other side of said armature at a junction terminal and the other end to said grounded terminal, a field winding terminal, and a field winding having one end connected to said junction terminal and the other end to said field winding terminal, said D.C. generator having associated therewith a main contactor with actuating coil to connect and disconnect said generator to and from the main bus, and an equalizer relay with actuating coil to connect and disconnect said junction terminal of said generator to and from the equalizer bus, said circuit comprising a reference voltage source, a first operation amplifier connected as an integrator and having an inverting and a non-inverting input, an output for providing an output signal, first voltage divider means connected between D.C. generator output and ground with a tap-off to said inverting input for providing a voltage input proportional to these output voltage of said D.C. generator, second voltage divider means connected between the main bus and said junction terminal of said D.C. generator and with a tap-off to said non-inverting input for providing a voltage input proportional to the output voltage of said main bus, whereby when said line contactor is open disconnecting said D.C. generator from the main bus the output of said first operational amplifier integrates in a positive direction when the level of said main bus voltage input is greater than the level of said generator output voltage input, and integrates in a negative direction when the level of said main bus voltage input is less than the level of said generator output voltage input, and whereby when said line contactor is closed connecting said D.C. generator to the main bus permitting said voltage dividers together to sense the voltage drop across said interpole winding due to current flow therethrough, the output of said first operational amplifier integrates in a positive direction when the level of said inverting input voltage is less than the level of said non-inverting input voltage indicating a reverse current flow through said D.C. generator, and integrates in a negative direction when the level of said inverting input voltage is greater than the level of said non-inverting input voltage indicating a normal forward current flow through said D.C. generator, a second operational amplifier having an inverting and a non-inverting input connected to said output of said first operational amplifier and to said reference voltage source, respectively, and an output for providing an output signal, said second operational amplifier being connected as a bistable switch providing positive and negative square wave output signals when said inverting input level is less and more, respectively, than said non-inverting input level, a static power switch directly controlling current flow from said output of said D.C. generator output and said actuating coils of said main contactor and said equalizer relay, a static control switch connected to the output of said second operational amplifier and connected in controlling relationship to said static power switch, said static control switch being responsive to said output of said second operational amplifier, whereby said control switch conducts when the output of said second operational amplifier is negative and blocks when the output of said operational amplifier is positive, and said power switch being responsive to the state of said control switch whereby said power switch conducts energizing current to said actuating coils of said line contactor and said equalizer relay when said control switch blocks, and blocks energizing current to said actuating coils of said line contactor and said equalizer relay when said control switch conducts.

3. The circuit of claim 2 in which said second operational amplifier power requirements are provided from the output of said D.C. generator together with fail-safe means for insuring the continuous energization of the actuating coils of said line contactor and said equalizer relay to maintain said D.C. generator on the line in the event of a remote ground fault which drops the system voltage below said second operational amplifier power requirements, said fail-safe means including a Zener diode having its anode connected to the output of said second operational amplifier and its cathode to said control switch and the output of said D.C. generator whereby said Zener diode blocks and said D.C. generator output voltage turns off said control switch thereby turning on said power switch and energizing said actuating coils of said line contactor and said equalizer relay when said second operational amplifier output is positive, and whereby said Zener diode conducts preventing said D.C. generator voltage from turning off said control switch thereby turning off said power switch and preventing the energization of said actuating coils of said line contactor and said equalizer relay when said second operational amplifier output is negative, and whereby said Zener diode provides a fixed amount corresponding to its Zener voltage by which said D.C. generator output voltage must exceed said second operational amplifier output voltage to permit said control switch to conduct thereby de-energizing said actuating coils of said line contactor and said equalizer relay such that as said D.C. generator output voltage falls below the power requirements of said second operational amplifier causing its output to become negative, said D.C. generator output voltage exceeds said negative output of said second operational amplifier by less than the Zener voltage of said Zener diode.

4. The circuit of claim 2 together with means for insuring said line contactor is not closed unless said D.C. generator output exceeds a predetermined level, said means comprising a Zener diode having a Zener voltage in circuit with said control switch and said power switch and said output of said generator and arranged to prevent said power switch from conducting when the output voltage of said generator is less than the Zener voltage of said Zener diode.

5. In combination with a D.C. generator connected in parallel with other D.C. generators to a main bus and to each other through an equalizer bus, a field relay trip control circuit for preventing excitation of said D.C. generator in the event of preselected fault and operating conditions, said D.C. generator having
an armature,
an output terminal connected to one side of said armature,
a grounded terminal,
an interpole winding having one end connected to the other side of said armature at a junction terminal and the other end to said grounded terminal,
a field winding terminal, and
a field winding having one end connected to said junction terminal and the other end to said field winding terminal, said D.C. generator having associated therewith
a main contactor with actuating coil to connect and disconnect said generator to and from the main bus, and
an equalizer relay with actuating coil to connect and disconnect said junction terminal of said generator to and from the equalizer bus, said circuit comprising
a reference voltage source,
static integrator means having a differential input and responsive to input differences to provide an integrated output signal from the input differences,
means for providing to said differential input of said static integrator means a first input signal proportional to the voltage level of said generator output with respect to said generator grounded terminal, and a second input signal proportional to the voltage level of said generator output with respect to said junction terminal of said generator when said main contactor is open and disconnects said generator from said main bus,
whereby said static integrator means provides a first output signal proportional to current flow through said interpole winding and said generator when said generator is disconnected from said main bus,
static means for algebraically combining said generator output voltage signal and said output signal of said second static integrator, and providing an output signal proportional to the combination,
static comparing and bistable switching means having a first input connected to said static means and a second input connected to said reference voltage source and having an output connected to energize said trip coil of said field relay to disconnect said field winding from the output of said generator and said generator from said main bus and said equalizer bus when said bistable switching means is in one of its two stable states, said bistable switching means being responsive to input signals whereby said trip coil is energized when said combination output signal of said static means exceeds said reference level by a predetermined amount.

References Cited

UNITED STATES PATENTS 3,225,284  12/1965  Yoshinori Kawai et al. __ 322—28

J D MILLER, Primary Examiner

H. FENDELMAN, Assistant Examiner

U.S. Cl. X.R.

317—18, 22, 26; 322—28